May 17, 1938.     I. M. ADAMS     2,117,266

FOOD FORM

Filed Aug. 24, 1936

IRENE M. ADAMS.
INVENTOR

ATTORNEY

Patented May 17, 1938

2,117,266

UNITED STATES PATENT OFFICE 2,117,266

FOOD FORM

Irene M. Adams, Portland, Oreg.

Application August 24, 1936, Serial No. 97,665

1 Claim. (Cl. 65—65)

This invention relates to improvements in means for arranging food in a dish or plate in such a way that various designs of animals, birds, or any other objects, or characters may be created.

A further object of the invention is a provision of means of this character which is adaptable to restaurants, tea rooms, and the like, that specialize in children's menus. The invention enables a mother or a caterer to arrange varieties of food in such a manner as to represent characters of story books, rhymes, and various other objects of interest to children.

By this same means children are induced to eat certain foods which would otherwise not appeal to them.

A still further object of the invention is the provision of a form which is flexible or of edible material and which may be of any suitable color.

These and other objects will appear as my invention is more fully hereinafter described in the following specification, illustrated in the accompanying drawing and finally pointed out in the appended claim.

Figure 1:
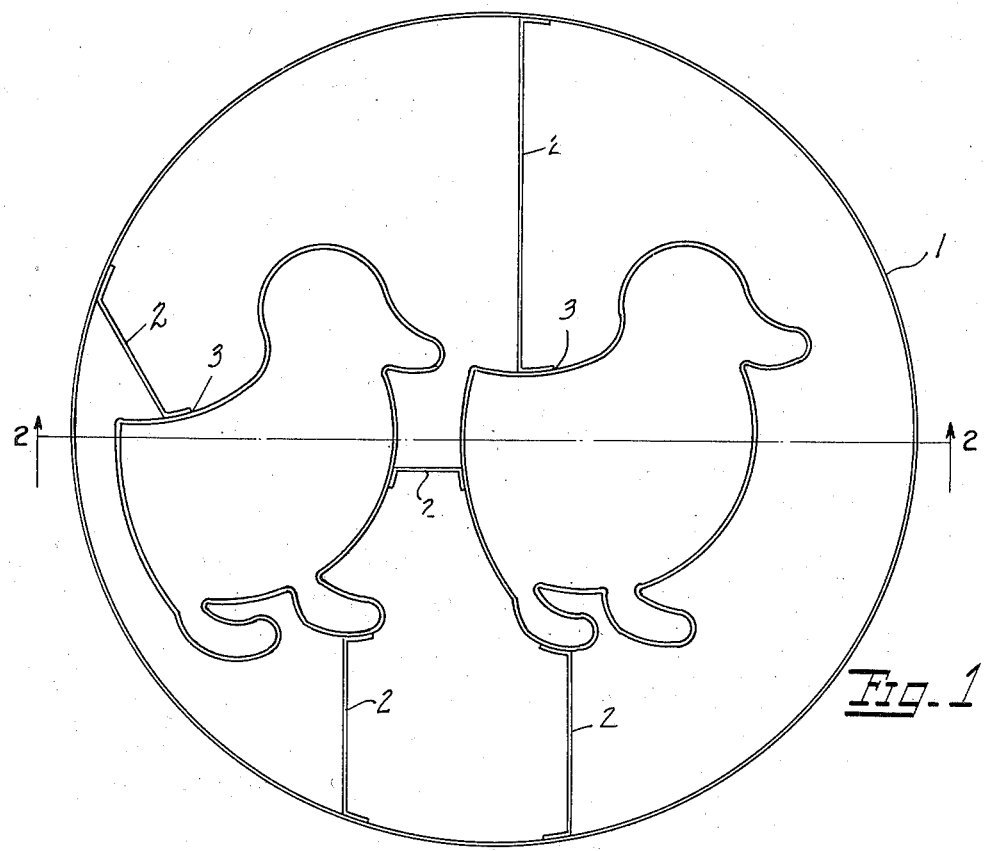
Figure 1 is a top plan view of a form made in accordance with my invention.
Figure 2:
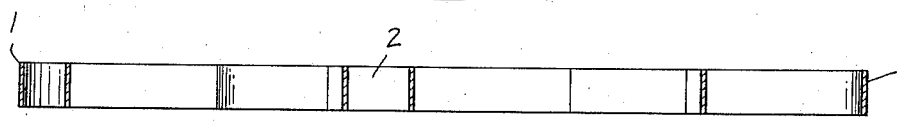
Figure 2 is a sectional edge-wise view taken on the line 2—2 of Figure 1.

Referring now more particularly to the drawing:

Reference numeral 1 indicates a ring of flat material which may be of any suitable width. Extending inwardly from the inner edges of the ring are a plurality of reinforcing members 2 adapted to stabilize the object, or objects, disposed within the ring.

The objects shown in the drawing are merely to demonstrate one of a great number of forms which may be used and which, as previously stated, may be of any shape or form to suit the taste of the user.

The particular objects shown in the drawing are made up of the same material as that of the ring 1, and the entire outline of each object may be made of one continuous piece of material of equal width to the material of the ring or in some instances it may be of less width if so desired. The reinforcing members which may or may not be of the same width as the ring material are secured at their inner ends to the body of the object, as at 3, by any suitable means.

In other forms of the invention I may eliminate the reinforcing members by arranging the objects in such a way that they contact each other and the ring 1. The entire material from which the device is made is sufficiently flexible so that when in use a child may easily dislodge the food from any of the small areas of the object.

Figure 3:
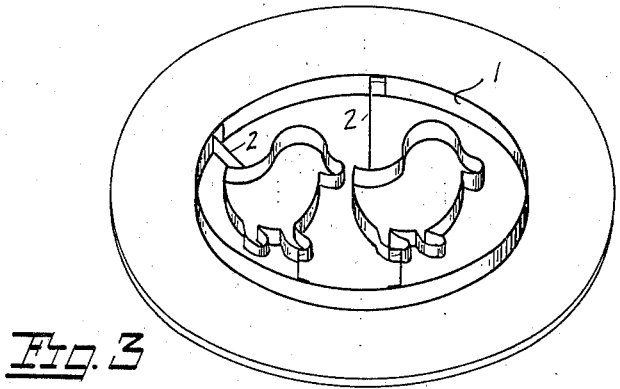
Figure 3 is a perspective view on a reduced scale showing the invention applied to a plate.

In Figure 3, I have shown the device in position on a plate and ready to receive the food. As an example of one of the many various arrangements and color schemes which may be created, the body and head portions of the object shown within the ring may be filled with mashed potatoes, the feet and bills of the objects may be filled with egg yolk, for example, to somewhat resemble the natural coloring of a duck. The wings and eyes may be outlined by arranging a certain amount of peanut butter along the sides of the body and head. The area surrounding the objects, and which is divided by the reinforcing members 2 into a series of compartments or divisions, may also be filled with foodstuffs of contrasting colors. For example, a green background of spinach may be provided. To obtain a red background beets may be arranged within one or all of the compartments.

As previously pointed out, the device may be made of any suitable material. For example, a form which will be durable and which may be used repeatedly may be made of waxed paper, parchment or the like. For a device which may be consumed by the user, I may make it out of pie crust, or the material out of which ice-cream cones are made or any other wafer material of like nature.

It is also possible to make the device out of macaroni material, which after assembly with the food, may be cooked or baked along with the rest of the contents of the plate.

While I have shown a particular form of embodiment of my invention, I am aware that many minor changes therein will readily suggest themselves to others skilled in the art without departing from the spirit and scope of the invention.

Having thus described the invention, what I claim as new and desire to protect by Letters Patent is:—

A form for arranging food on the inner base portion of a serving plate, said form comprising a ring member of a diameter equal to that of the inner base portion of the plate, and formed with a vertical wall, a series of vertical inner walls disposed within the ring member and connected with each other and with the wall of the ring, certain of said inner walls being of a particular shape to resemble various likenesses of birds, animals and the like, other of said inner walls dividing the space surrounding said particularly shaped walls into a series of irregular compartments, and all of said walls being of flexible material whereby they may be distorted for removing food lodged between them.

IRENE M. ADAMS.